(12) United States Patent
Takagi et al.

(10) Patent No.: US 7,811,400 B2
(45) Date of Patent: Oct. 12, 2010

(54) APPARATUS AND METHOD FOR MANUFACTURING RUBBER SHEET REINFORCED WITH CORD

(75) Inventors: Sigemasa Takagi, Hashima (JP); Tosiaki Morisaki, Hashima (JP); Hikaru Yamada, Hashima (JP)

(73) Assignees: Fuji Seiko Co. Ltd., Gifu (JP); Fuji Shoji Co. Ltd., Gifu (JP)

( * ) Notice: Subject to any disclaimer, the term of this patent is extended or adjusted under 35 U.S.C. 154(b) by 1037 days.

(21) Appl. No.: 10/584,986

(22) PCT Filed: Jan. 5, 2005

(86) PCT No.: PCT/JP2005/000262

§ 371 (c)(1),
(2), (4) Date: Jun. 30, 2006

(87) PCT Pub. No.: WO2005/065926

PCT Pub. Date: Jul. 21, 2005

(65) Prior Publication Data

US 2008/0190549 A1    Aug. 14, 2008

(30) Foreign Application Priority Data

Jan. 5, 2004    (JP) .............................. 2004-000140

(51) Int. Cl.
*B29C 53/60*    (2006.01)

(52) U.S. Cl. ....................... 156/193; 156/195; 156/426; 156/429; 156/457; 156/906

(58) Field of Classification Search ................. 156/143, 156/173, 174, 193, 195, 117, 426, 427, 429, 156/431, 906, 407, 457
See application file for complete search history.

(56) References Cited

U.S. PATENT DOCUMENTS 2,759,521 A * 8/1956 Hall et al. .................... 156/429
3,532,580 A   10/1970 Kanao (Continued)

FOREIGN PATENT DOCUMENTS

EP    526 382    2/1993

(Continued)

*Primary Examiner*—Geoffrey L Knable
(74) *Attorney, Agent, or Firm*—Gary C. Cohn PLLC

(57) ABSTRACT

The invention resides in enabling high-mix low-volume production by a compact apparatus for a rubber sheet reinforced with a cord of a belt material for a tire, a body-ply material, etc. variously changing a cord material, cord arrangement angle, width of sheet, etc. and relates to manufacturing apparatus and method for a rubber sheet reinforced with a cord according to wrapping around a rubber coated cord group continuously on a surface of a pair of a cylindrical rotating body rotating in the same direction or on a surface of a cylindrical rotating body disposed small diameter roller groups of plural number on a side surface of a cylinder.

18 Claims, 6 Drawing Sheets

U.S. PATENT DOCUMENTS

| | | | |
|---|---|---|---|
| 3,658,625 A * | 4/1972 | Ishikawa et al. | 156/429 |
| 3,910,808 A * | 10/1975 | Steward | 156/429 |
| 3,919,026 A * | 11/1975 | Mizutani et al. | 156/143 |
| 4,033,808 A * | 7/1977 | Petzetakis | 156/425 |
| 4,454,000 A * | 6/1984 | Schlemmer | 156/502 |
| 5,151,281 A | 9/1992 | Huvey | |
| 5,217,723 A | 6/1993 | Tsingopoulos | |
| 5,637,168 A | 6/1997 | Carlson | |
| 6,913,058 B1 | 7/2005 | Takagi | |
| 6,969,439 B1 | 11/2005 | Takagi | |

FOREIGN PATENT DOCUMENTS

| | | |
|---|---|---|
| JP | 58-173629 | 12/1983 |
| JP | 2001-260251 | 9/2001 |
| JP | 2004-130524 | 4/2004 |
| WO | WO 89/04246 | 5/1989 |

* cited by examiner

A

B

APPARATUS AND METHOD FOR MANUFACTURING RUBBER SHEET REINFORCED WITH CORD

FIELD OF THE INVENTION

The invention relates to an apparatus and a method for manufacturing a rubber sheet reinforced with a cord, especially concerns with an apparatus and a method for manufacturing a rubber sheet reinforced with a cord which is capable of high-mix low volume production of belt material for a tire, a body-ply material, etc. by a compact apparatus variously changing cord materials, arrangement angles of cords, widths of a sheet, etc according to continuously wrapping around a rubber coated cord group on a surface of a cylindrical rotating body.

BACKGROUND OF THE INVENTION

Conventionally, manufacturing of a rubber sheet reinforced with a cord used for tires etc. has been produced by a mass and concentration production system. Necessary belt material, body-ply material, etc. were produced reeling out 1000 to 2000 cords, manufacturing large rolled goods after coating with rubber by a large calendering apparatus, then cutting to necessary width and an angle and produced necessary belt material, body-ply material, etc. But recently, various high functional fibers are developed for tires and specifications of tires have also become diversified depending on various types of vehicle, rubber specifications, fiber specification, fiber arrangement angle, sheet width, etc. of belt material and body-ply material have also required in various kinds. Accordingly, to manufacture those rubber sheets by abovementioned mass production method, it required time, waste was large and in consequence it was not efficient.

Additionally, as it is seen in Japanese Patent Publication No. Sho 35-18602, forming a cylindrical wound body joining sides of ribbons to each other while continuously winding spirally ribbons consisting of a rubber coated cords on a large diameter roller, forming large area rubber sheet reinforced with cord, by cutting this wound body, it is also possible to cut away from this sheet belt material, body-ply material, etc. arranged cords in predefined shapes and predefined directions, but it is a waste as a cutting residue is large. In this case, a waste is small if a cylindrical body is prepared wrapping rubber coated cords on a small diameter roller and cutting it, and forming predefined shape ply material by joining several of these, but joining of sheet requires man-hours and time, and further an unevenness of a joined part remain also qualitatively.

In addition, as it is seen in Japanese Patent Laid-Open No. 2001-145961 and Japanese Patent Laid-Open No. 2002-127270, there are methods of manufacturing of belt material and body-ply material by wrapping a cord reinforced rubber coated ribbon on a predefined diameter mandrel and cutting it by a predefined angle but a new mandrel is needed by every change of width of a cord, a cord angle and driving.

Moreover, since a sheet arranged cords obliquely obtained from aforementioned conventional technology has not a chance to be manufactured as continuous sheet of objective product width, manufacturing efficiency is bad, and it has been desired technology to manufacture continuously a sheet of objective width arranged cords obliquely by simple and convenient apparatus.

SUMMARY OF THE INVENTION

The invention is conducted to eliminate above-mentioned defects of conventional technology, the purpose resides in to enable a production system only required amount when required and that a system that can produce a high quality product simply and conveniently in manufacturing of a rubber sheet of a tires etc. as is represented by TOYOTA System in automobile industry. In addition, the other object resides in enabling to supply products of various kinds such as a kind of different cords and a kind of rubber only required amount when required by simple and convenient means. Also, the other object is to enable manufacturing of a rubber sheet reinforced with a continuous cord, which has a different arrangement angle of cords changing an arrangement angle of cords simply and conveniently. Additionally, the other object resides in enabling to manufacture simply and conveniently width of a sheet reinforced with a cord variously changing in accordance with specifications of tires. Also, the other object resides in to reduce a waste of discarded and not used sheet material. Additionally, the other object resides in to provide a rubber sheet reinforced with a high quality cord of a little irregular eliminating unevenness on a perimeter when overlapping a ribbon on a drum. In addition, the other object resides in to save waste of time and effort to make such as to prepare belt material and body-ply material overlapping multiple aforementioned rubber sheets. Also, the other object is to provide an apparatus possible to manufacture simply and conveniently with a cheap and small apparatus. And, the other object resides in to provide an apparatus with improved yield and good stability of operation by enabling to conduct fine adjustment etc. that occurs during operation simply and conveniently. Further, the other object resides in to provide means to continuously manufacture a sheet of objective product width disposed a cord obliquely with a simple and convenient apparatus.

The invention relates to manufacturing of a rubber sheet reinforced with a cord. A cord in the invention includes also yarn composed of fibers, a monofilament, a cord of metallic thin wire, etc. and its simple body. In addition, a shape of these cords may be multifilament consist of long filaments, spun yarn consist of short fibers, covered yarn in which core yarn is wrapped with the other yarn and yarn called Picco ply yarn (piled yarn of different nature strand). Also, fancy yarn can also be used. These cords, although use a cord already applied adhesive treatment, can be led to rubber coating means connecting to a dipping apparatus applying dipping treatment. As for materials for a cord, organic fiber such as nylon fiber and polyester fiber, polyvinyl alcohol fiber, aramid fiber, wholly aromatic polyester fiber and PBO (paraphenylene benzobisoxysazole) fiber, inorganic fiber such as glass fiber, alumina fiber and carbon fiber, and metal fiber such as steel and amorphous metal are can also be used.

The cord used for the invention has been applied adhesive treatment that increases adhesiveness to rubber. As for adhesive treatment for a cord, attaching resorcin-formalin latex and rubber emulsion for organic fiber, after drying moisture, a method to increase adhesiveness to rubber after baking resorcin-formalin is typical. Also, as for a steel cord, brass plating which electrodeposits copper and zinc, bronze plating of cupper and tin, zinc plating mainly zinc, etc. are applied. Further, as for metal fiber, mean of adhesive treatment etc. using cobalt and molybdenum, silane coupling agent, etc. also can be used. These adhesive treatments are selected appropriately from a kind of cords, a kind of rubber, required adhesion, etc. and are not limited to examples illustrated here.

In addition, as rubber used for the invention, not only rubber used after vulcanization such as natural rubber and synthetic rubber, but also rubber no need to be vulcanized called thermoplastic elastomer such as polyurethane and SBS (styrene-butadiene-styrene rubber) can be used. These cords and rubber are selected appropriately depend on use application of an intended rubber sheet. A rubber coated cord is said to one coated with rubber described herein on above-mentioned cord. Coating of rubber uses means to coat rubber extruded from rubber extruder to a cord in a die. In addition, a method such as attaching rubber processed by a calender and a method drying rubber solvent after coating adhesive latex to a cord can also be used.

The invention relates to manufacturing of a rubber sheet reinforced with a cord according to continuously wrapping around a rubber coated cord group (in some cases may be expressed a ribbon) on a surface of a cylindrical rotating body. A cylindrical rotating body, although includes usual a mere roller, consists of a cylinder that each of a small diameter roller group formed of a column of a polygonal column (strictly speaking it is a polygonal column but in the invention included in cylindrical rotating body) as go into detail below, and preferably the one that rotates centering around an axis of the cylinder is to be a cylindrical rotating body. A surface of a cylindrical rotating body in the case is said to the side surface portion although cylindrical shape consist of a portion consisted of a circular plain surface and a portion consisted of a side surface consisting of a curved surface. A cylindrical rotating body in the invention rotates centering on the axis of the cylinder and is wrapping around rubber coated cord group on a surface of cylindrical rotating body, but the rotation in the case is desirable that each cylindrical rotating body rotates by driving. But, as tire cords are large in both strength and elastic modulus and generally cords of plural number run as a group in the invention; it is possible to rotate cylindrical rotating body with strength of a cord without especially takes driving.

The invention, an axial direction of a cylindrical rotating body and an axial direction of a cylindrical rotating body that are disposed to make a pair with the cylindrical rotating body are disposed obliquely only predefined angle β from parallel, forming a cylindrical rubber sheet wrapping spirally rubber coated cords continuously contacting cords with each other on the both rotating bodies in a state the pair of cylindrical rotating bodies is rotating in the same direction, manufactures a rubber sheet reinforced with a cord according to be formed of the cylindrical rubber sheet to send on a pair of cylindrical rotating bodies to an axial direction of a cylinder. In this way, it uses a property that a cord try to enter an axis of the next rotating body at a right angle when a cord moves to the next rotating body left from one rotating body according to tilt a cylindrical axis predefined angle β from parallel between two cylindrical rotating bodies. That it is formed to be able to cycle in proportional pitch to a tilt angle between two cylindrical rotating bodies; a method that a cord is moved to an axis direction of rotating body in these principles is called Nelson Method. This predefined angle β is a little bit and is usually from 0.1 degree to 30 degree or less, preferably from 1 degree to 20 degree or less and the most preferably from 2 degree to 10 degree or less. By this angle and distance between center cores of axes of paired two cylindrical rotating bodies, the pitch of the same cord running on one roller is determined. Therefore, when number of cords supplying a cord group is large and cord group width is wide, this predefined angle and the distance between cylindrical rotating bodies are enlarged. In Nelson Method of the invention, a rubber coated cords group is wrapped around on this pair of cylindrical rotating bodies, in a principle of Nelson method, a cylindrical rubber sheet is formed and continuously transported to an axial direction of the cylindrical rotating body.

In Nelson Method of the invention, if a distance between axes of a pair of cylindrical rotating bodies is varied, a diameter of a formed cylindrical rubber sheet is varied. Still, a diameter of a cylindrical rubber sheet does not show a real circle in a cross-section surface in a state actually manufacturing, but means a diameter when makes it to a real circle shape. Accordingly, by varying center distance between a pair of cylindrical rotating bodies, width of an objective rubber sheet can be controlled freely according to cut through a cylindrical rubber sheet. In that case, increasing and decreasing supplying number of rubber coated cords to a cylindrical rotating body as discussed previously, it is necessary to be formed a cylindrical rubber sheet spirally wrapped cords continuously contacting with each other.

The invention characterizes in that width of the manufactured rubber sheet can be varied simply only varying center distance between a pair of cylindrical rotating bodies as discussed previously. But, when a rubber coated cord group returns to the former cylindrical rotating body after making a circuit between this pair of cylindrical rotating bodies, both the cord group and newly entering cord group are continuously spirally wrapped contacting with each other to form a cylindrical rubber sheet, not only center distance by calculation but there is a case that fine adjustment is needed. In such cases, if fine adjustment takes a long time, there is a case that discrepancy occurs to an object of the invention to manufacture sheet width of a various kind simply and conveniently with high yield. In the invention, two means are provided for this fine adjustment means.

As the fine adjustment means 1, it is possible to finely adjust a position where a rubber coated cord group returns by providing a push over roller guide in a process that a rubber coated cord group returns to the former cylindrical rotating body after making a circuit between a pair of cylindrical rotating bodies of the invention. This roller is installed at right angle to a traveling direction of a cord group and it can be finely adjusted by adjusting a position with its pressing force, but it also can be finely adjusted by only varying a tilt angle slightly according to install it obliquely.

As the fine adjustment means 2, when forming a cylindrical rubber sheet spirally wrapped continuously contacting each other a rubber coated cord group a supplying a rubber coated cord group to a cylindrical rotating body through a supply guide and a rubber coated group b which has made a circuit already wrapped around on a cylindrical rotating body, a cord group a and b can be conducted a push over to contact with each other by a pair of zipper roller guide provided on each cord group a and b. A zipper roller guide consists of a taper type gear and is one tries to get together cord groups engaging gear by pressing a near side of a contact point (side to be engaged) which is a engaging point of the pair of gear to contact a surface of a cord group a and b. Accordingly, a cord group a and b are drawn with each other and becomes to be able to run contacting with each other according to using a pair of zipper roller guides and using these face to face with a higher side of a slope of a roller.

At least one of a pair of cylindrical rotating bodies of Nelson Method in the invention is preferably consisted of a cylinder that each of a small roller group is formed of a column of a polygonal column (in the invention included in cylindrical column). The other cylindrical rotating body in the case may be an ordinary roller, according to be such constitution, arranging strictly a pitch etc. of a cord on a cylindrical rotating body consisting of a small roller group and an ordinary roller can vary a diameter of a cylindrical rubber sheet simply and conveniently by varying above-mentioned center distance simply.

Manufacturing means of a cord reinforced rubber sheet by continuously wrapping around a rubber coated cord group on a surface of a cylindrical rotating body of the invention can adopt Kuljian Method apart form above-mentioned Nelson Method. Kuljian Method can also said to be an application of Nelson method, but is one using one cylindrical rotating body not using a pair of cylindrical rotating bodies. And the cylindrical rotating body is formed of disposing a small roller group of plural number in circumference direction, consisting of a cylinder that each of a small roller group is formed of a column of a polygonal column (strictly a polygonal column but expresses a cylindrical rotating body in the invention) and an axial direction among each neighboring small diameter rollers of the small diameter roller groups of the plural number is disposed obliquely only a predefined angle γ from parallel with each other. And, by this cylindrical rotating body to rotate, a cylindrical rubber sheet is formed wrapping around a rubber coated cord on the cylindrical rotating body while spirally wrapping continuously contacting a rubber coated cord with each other on this cylindrical rotating body. And moving this cylindrical rubber sheet to an axial direction of a cylindrical rotating body, a rubber sheet reinforced with a cord is manufactured. The predefined angle γ among neighboring rollers is a little bit, usually from 0.1 degree to 30 degree or less, preferably from 1 degree to 20 degree or less and the most preferably from 2 degree to 10 degree or less. Setting of this delicate angle can be made to dispose an axis direction of among nearby small rollers obliquely only predefined angle γ from parallel with each other by a flange of one side disposed small roller groups of plural number is rotated centering around a central axis of a flange in a flange disposed both sides across a frame. During a cord is going over among rollers of a small diameter roller group like this, a cylindrical rubber sheet is formed continuously and is sent on a surface of the cylinder by sending while shifting a position of cord little by little.

In this Kuljian Method, it is possible to circulate a cord on one cylindrical rotating body without a need of a rotation body of roller type other than a cylindrical rotating body as Nelson Method and it has a characteristic in a point that an apparatus become compact. However, even using a cylindrical rotating body in Gujan Method, if a cord is circulated between a pair of cylindrical rollers (at least one of them is a cylindrical rotating body of Kuljian Method), width of a rubber sheet can also be controlled simply and conveniently but in that case, it is included in Nelson Method in the invention.

In Kuljian Method of the invention, when a rubber coated cord group is gradually wrapped around on this cylindrical rotating body, a rubber coated cord group is wrapped around spirally on a cylindrical rotating body, moving transversely a cord on this cylinder only corresponding amounts of tilting of each roller as rotation of a cylindrical rotating body of the invention because this small roller group is tilted slightly and it is carried to one side of a cylindrical rotating body forming a cylindrical rubber sheet consists of a rubber coated cord group. Each small diameter roller in the invention may be rotated freely but it is desirable that each roller is formed to rotate by driving. By being driven, accuracy that moves shifting transversely by predefined position is improved. But, if a rubber coated cord consists of a cord that is thick and has strength like a tire cord, there is a case that driving of small diameter roller group is not necessarily required as rotating each roller correctly by a tension of each cord.

Center distance of small roller group formed of a cylindrical rotating body in Kuljian Method of the invention is desirably formed to vary the distance. According to varying the center distance, a diameter of a cylindrical rotating body can be varied. Varying a diameter of a cylindrical rotating body, a diameter of a cylindrical rubber sheet consist of a rubber coated cord wrapping spirally on a cylinder can be varied and when this cylindrical rubber sheet is cut through to a plane sheet, sheet width can be varied. Necessary width of rubber sheet reinforced with a cord is required various ones in tire etc. by a kind of cars, and waste are large in a conventional method that cut it away from a sheet of wide width. In the invention, it is characterized in that a rubber sheet of various widths can be produced simply and conveniently without waste.

In a cylindrical rotating body formed of small diameter roller groups of plural number in the invention, it is characterized in that each surface length transporting a cylindrical rubber sheet of a small diameter roller formed of a cylindrical rotating body is 1.5 times or more and 10 times or less of width of a rubber coated cord group. Plural small diameter roller groups, especially when each of them is driven, becomes difficult an axial direction among each neighboring small diameter rollers of small diameter roller groups of the plural number to maintain strictly accuracy of a tilt angle γ from parallel with each other if the surface length is long. But, by shortening surface length of rollers; it is possible to reduce request for strictness of this accuracy. In the invention, as a cylindrical rubber sheet is pressed by a zipper roller guide etc. described above and a presser roller etc. to be hereinafter described, transporting force of cylindrical rubber sheet to each surface length direction of a small diameter rubber roller is large. As the result, it is clarified from experimental results that it can be transported sufficiently even if surface length to transport a cylindrical rubber sheet of small a diameter rollers is short. The surface length depends on width of a rubber coated cord group supplied to a cylindrical rotating body through a supply guide and if width of a sending cord group is large, the surface length is necessary to be large. And surface length transporting each cylindrical rubber sheet of the small diameter roller is 1.5 times or more, preferably 2 times or more, and that 10 times or less, preferably 7 times or less and the most preferably 5 times or less of width of a rubber coated cord group. If it exceeds 10 times, it is necessary to maintain a value of each γ strictly because it makes difficult such as machine production, maintenance and operability of an apparatus.

The invention provides a supply guide to neighborhood of the surface of this cylindrical rotating body and a rubber coated cord group guided to the supply guide is wrapped around on a cylindrical rotating body in accordance with rotation of a cylindrical rotating body. Therefore, a supply guide need not to be moved, it may be fixed to neighborhood of a surface of a cylindrical rotating body and the supply guide does not move if a cylindrical rotating body rotates. Rubber coated cords supplied from a supply guide, although it may be a single, are usually supplied in plural number, supplying cords of plural number in parallel by the supply guide, and are formed to wrap spirally contacting with each other to make those plural cords as whole to be a sheet of one layer. And, those plural cord groups (sometimes may be called a ribbon) are supplied to a supply guide not to make a gap adjacently and to join with each other to the former cord group at the next spiral wrapping after a cylindrical rotating body has made a circuit. In Nelson Method, supplying a rubber coated cord group not to make a gap between yarns is determined by width of a rubber coated cord group, a diameter and rotation number of a cylindrical rotating body, a distance between a pair of cylindrical rotating bodies and a tilt angle β between a pair of cylindrical rotating bodies. And in Kuljian Method, it is determined by width of a rubber coated cord group, a diameter and rotation number of a cylindrical rotating body, tilt γ of a small diameter roller group, etc. Meanwhile, it is also possible to increase productivity by providing a supply guide in multistage. And, means to fine adjust not to make a gap between yarns is described previously.

A manufacturing apparatus for a rubber sheet reinforce with a cord of the invention has desirably a presser tool to press a cylindrical rubber coated sheet formed by wrapping around a rubber coated cord group on a cylindrical rotating body. A presser tool equalizes a range of a rubber coated cord of a cylindrical rubber sheet and ensures further joining of each other rubber coated cords. Pressing can also be conducted by pressing roller etc. directly to a cylindrical rotating body but can be pressed also by a nip roller etc. immediately after a cylindrical rubber sheet left a cylindrical rotating body. Meanwhile, above-mentioned zipper roller guide can be combined with a function of presser tool.

A manufacturing apparatus for a rubber sheet reinforced with a cord of the invention preferably has a means to cut away spirally a cylindrical rubber coated sheet formed by wrapping around a rubber coated cord group on a cylindrical rotating body by a cutter. In a manufacturing process for a cylindrical rubber sheet, a cylinder is cut through according to spirally cut away by a cutter and a rubber sheet of objective product width arranged a cord predefined angle against a longitudinal direction of a sheet can be taken out continuously. As for cutting place, although it can be conducted on a cylindrical rotating body, it is preferable to cut where it leaves a cylindrical rotating body not to injure a cylindrical rotating body. By providing a cutter united with above-mentioned pressing tool where it leaves a cylindrical rotating body, an apparatus becomes compact. As for a cutter, various types are used such as a razor blade, a rotating blade and a receiving roller, a shear cutter and a laser beam. Moreover, a cylindrical rubber sheet can also be made to a product cut to predefined length as a cylindrical sheet as it stands, and one cut to predefined length can also be cut through spirally in a separate process.

According to cut away spirally by a cutter in the invention, a rubber sheet arranged a cord in predefined angle $\alpha$ against a longitudinal direction of sheet can be manufactured. This angle $\alpha$ is defined by width w of supplying rubber coated cord group, a diameter D of a cylindrical rubber sheet, a tilt angle $\beta$ or $\gamma$ between a pair of cylindrical rotating bodies, etc.

Width of a rubber sheet reinforced with a cord in the invention is defined by a diameter of a cylindrical rubber sheet. An arrangement of cord of predefined angle $\alpha$ is selected from range of, for example, 80 to 90 degree against a molding drum axis for a body-ply sheet of a radial tire, 10 degree to 35 degree, preferably from 15 degree to 30 degree against a molding drum axis for belt material for a tire. Here, a sheet for body-ply is a carcass sheet to be a framework of a radial tire, a bias tire, a belted-bias tire, etc. A sheet for a belt, in a radial tire, a belted-radial tire, etc., has what we call "hoop effect" arranging thickly in approximately a perimeter direction a strong and not easy to extend cord. In the other, there is also a breaker etc. in a rubber sheet reinforced with a cord used for a tire and it is included in a rubber sheet reinforced with a cord of the invention.

A rubber coated cord in the invention preferably guided to a cylindrical rotating body of the invention continuously producing a rubber coated cord according to a cord applied with an adhesive joining treatment for a rubber reeled out from a reel (or a bobbin) passes through a rubber coating die coating rubber extruded from a rubber extruder. According to connecting a rubber coating apparatus to an apparatus having a cylindrical rotating body like this, not only complicated and space-occupying process that are unreeling, winding and storage of a cord when coating rubber in separate step are not necessary but waste when unreeling cord and at winding core is decreased. And, dirt of a cord is less as a cord has no chance to be taken up, it becomes excellent one qualitatively as chemical are not bloomed and a fresh rubber coated cord can be used. Connecting a means to coat a rubber to a cord and a means to manufacture a cylindrical rubber sheet like this becomes especially an effective means as manufacturing of a rubber sheet reinforced with a cord of the invention is conducted continuously.

When connecting a rubber coating apparatus to an apparatus having a cylindrical rotating body, it is preferable to install a tension adjustment device that keeps constant tension of a cord guided to a cylindrical rotating body. As a rubber extruder needs time to be constant out put of rubber, for operating an apparatus of the invention stably without wasting a rubber coated cord during that time, it can be achieved by varying supply velocity of a cord or conducting velocity change smoothly during conducting fine adjustment of a process. Adjustment of tension is conducted by varying rotation number of a cylindrical rotating body, providing a dancer roller, with a means to detect a position of a dancer roller and a means such as to detect tension itself electrically. Additionally, this tension adjustment device is able to have also a function as an accumulator.

And, a cord applied adhesive treatment to a rubber unreeled from a reel in the invention, unreeling giving a twist by a twister or an assembly winder, is also possible to be guided to a cylindrical rotating body of the invention. A mean to give a twist to a cord usually a twister is used. A twister is to give twist to a cord and one twisting while doubling cords of plural number is also included. In addition, a principle of ring spinner, mule spinning frame, etc. used for fine spinning machine of short fibers can also be used. A twister is based on a ring twister but depending on a type, an up-twister, a double twister, a flyer spinning frame, Italian-type twister, covering-type twister, etc. can be used, and an old type such as Hatcho twisting machine etc. can also be used. A twister in the invention is preferably one in which a cord is twisted while unreeling and the most preferably the one combined with an unreeling machine and a twister of a cord.

Further, a cord applied adhesive treatment to a rubber unreeled from reel in the invention is a steel cord, when the steel cord is unreeled from a reel, it is possible to unreel while untwisting a twist generated when unreeling from a reel by going through an untwisting machine. A steel cord may have a case to be affected as distortion and a defect of a steel cord even in a state that has a little twist entering by unreeling from a reel etc., such a twist needs to be eliminated as much as possible as it generates curl in resultant rubber sheet. A steel cord can also be eliminated such a twist by drawing from a side while rotating a reel. But because the invention uses a various cord in high-mix low-volume production, that there is a case not to meet a object of the invention to aim a compact, cheap and simple and convenient apparatus to prepare special unreeling machine for steel cord is not only expensive but also needs a place. In such a case, it is possible to achieve an object using them as an untwisting machine by rotating reversely above-mentioned twister and an assembly winder.

Advantageous Effects of the Invention

The invention has made possible a method that can eliminate inefficiency, material and a waste of time in conventional mass production methods and can produce simply and conveniently only the needed quantity when needed and that a high quality product in manufacturing of rubber sheet for tires etc. Also, it is possible to offer only the needed quantity when needed products of various kinds such as a kind of various cords and a kind of rubber by simple and convenient means. Additionally, a rubber sheet reinforced with a continuous cord differing in a cord arrangement is made possible to manufacture also by changing cords arrangement angle simply and conveniently. In addition, it is possible to manufacture simply and conveniently variously changing width of a sheet reinforced with a cord in conformity with specifications of tires. Also, it is possible to decrease a waste of discarded and unused sheet material. Additionally, unevenness on a perimeter when overlapping a conventional ribbon on a drum can be eliminated in the invention and a means to manufacture rubber sheet reinforced with a high quality cord with a little disturbance can be offered. In addition, a waste of time and effort to make in forming method of belt material and body-ply material that have been conducted conventionally overlapping a great number of rubber sheets can be eliminated in the invention. Also, the invention can offers means to manufacture simply and conveniently by a cheap and small apparatus. And, the invention becomes possible to conduct simply and conveniently fine adjustment etc. generated during operation, and can be a manufacturing means with improved yield and good operational stability. Further, the invention offers means to continuously manufacture a product of objective width by a simple and convenient apparatus although a sheet arranged a cord obliquely obtained from conventional technique had bad manufacturing efficiency as it is not manufactured for a continuous sheet.

DETAILED DESCRIPTION OF PREFERRED EMBODIMENTS

Figure 1:
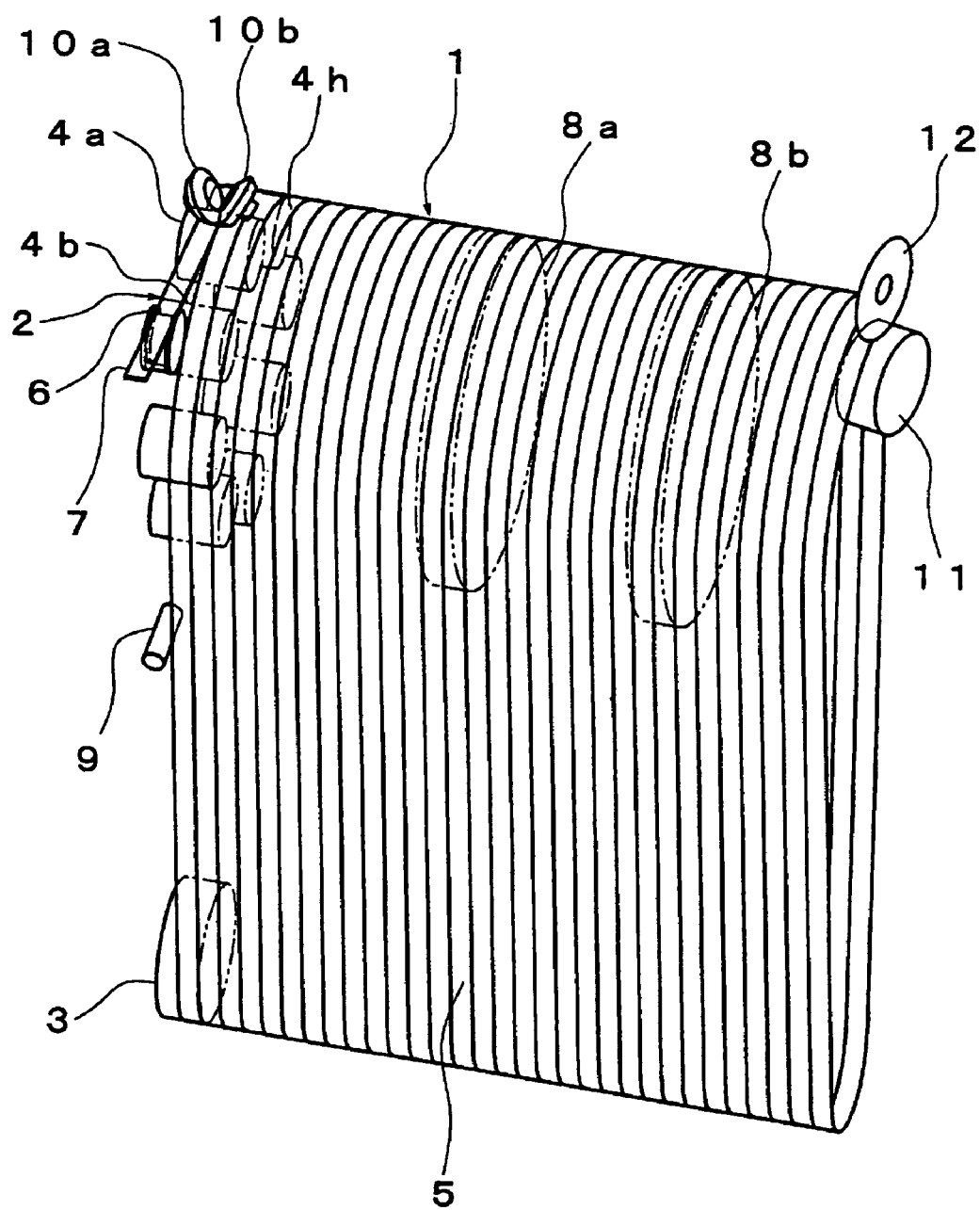
FIG. 1 is a side view of a forming apparatus for a rubber sheet reinforced with a cord according to Nelson method of the invention.

In the following, the invention is described based on examples illustrated by drawings. FIG. 1 shows an outline of a forming apparatus for a rubber sheet reinforced with a cord in Nelson Method of the invention in a side view of an apparatus. An apparatus for forming a rubber sheet 1 of the invention is formed of a rotating cylinder 2 and a roller 3, a rotating cylinder 2 and a roller 3 are in relation of Nelson roll and are disposed tilting only a predefined angle. A rotating cylinder 2 is formed of 8 small diameter rollers 4a, 4b, . . . , 4h and each axis of these small diameter rollers 4 are fixed tilting only predefined angle each other by relation of Kuljian roller. And, these small diameter rollers 4 are driven respectively. And surface length of rollers of these small diameter rollers 4 transporting this cylindrical rubber sheet 5 is in a relation of 1.5 times or more and 10 times or less of width of a rubber coated cord group 7 supplied through a supply guide 6. A cord group 7 is supplied to this rotating cylinder 2, it is wrapped spirally between a rotating cylinder 2 and roller 3 which are in relation of Nelson roll and a wrapped rubber coated cord group 7 is sent becoming a cylindrical rubber sheet 5. As surface length of a small diameter roller 4 and roller 3 are short, it is desirable to be installed an auxiliary ring 8a and 8b to rotate transporting a cylindrical rubber sheet 5. Additionally, it is formed of installing a push over roller guide 9 in a process returning a cord group 7 from roller 3 to a rotating cylinder 2 to adjust finely a return position of a rubber coated cord. And, it is possible to conduct a push over to contact a cord group 7 with each other by a pair of zipper roller guides 10a and 10b to be continuously wrapped spirally contacting each other a rubber coated cord group 7 supplying to a cylindrical rotating body 2 through a supply guide 6 and a rubber coated cord group which have made a circuit and returned already wrapping around on a cylindrical rotating body 2. A pair of zipper roller guides 10a and 10b is carved gear on tilting surfaces contacting with each other and are formed to engage mutually. Transported rubber sheet 5 is cut through by a receiving roller 11 and a cutter 12, and can be made to a rubber sheet of constant product width arranged a cord obliquely. Or it is possible to be a rubber sheet reinforced with a cord arranged a cord obliquely, by cutting it to appropriate length with a cylinder status as is and spirally cut through it in the other process.

Figure 2:
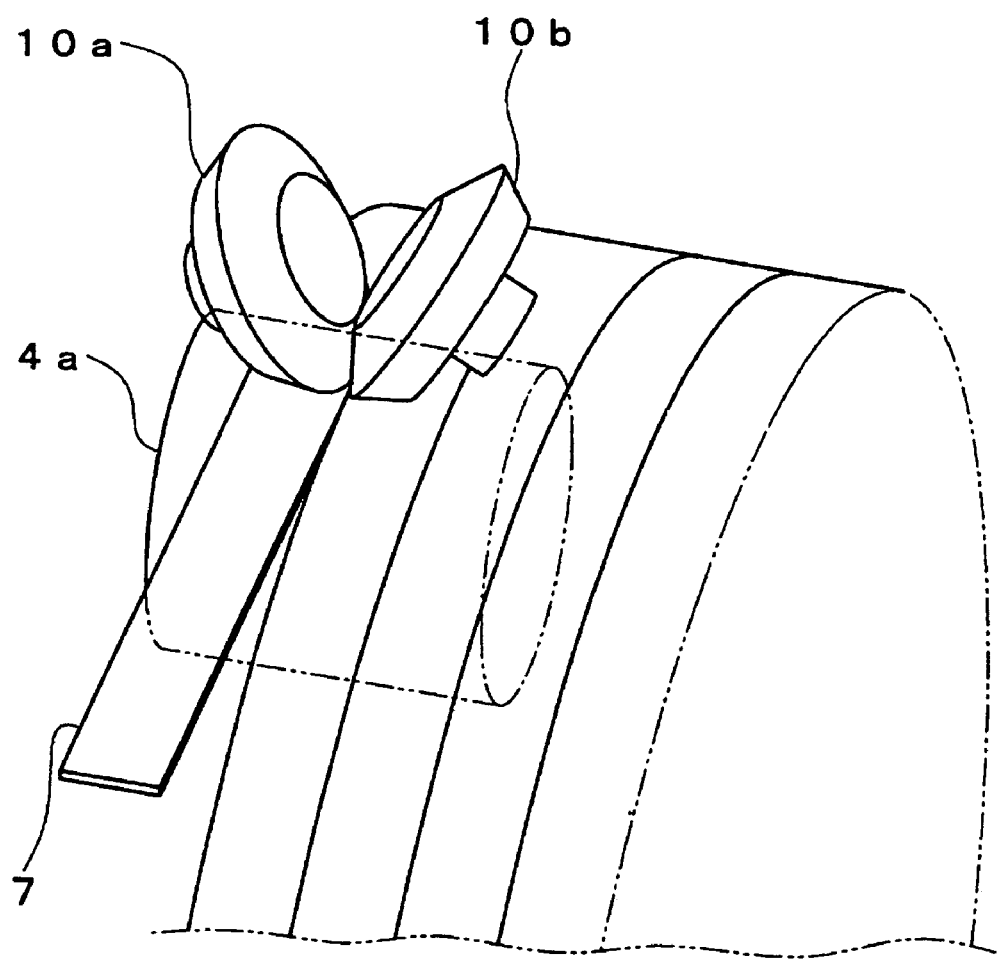
FIG. 2 is an enlarged zipper roller portion of FIG. 1.

According to a method shown FIG. 1, a cylinder diameter of a cylindrical rubber sheet 5 can be varied simply and conveniently by only varying a position of roller 3. The position adjustment of the roller 3 can be conducted by means such as to provide a fixing position to a mount of a roller 3 in multistage and to be able to change the position freely by making a fixing hole a long hole. Additionally, it was facilitated to finely adjust not to make a gap in a cylindrical rubber sheet 5 by a push over roller guide 9 and zipper roller guide 10a and 10b. In FIG. 2, a zipper roller guide portion is shown enlarged. In addition, fine adjustment in handling and operation of an apparatus becomes simple as roller surface length of small diameter rollers 4 and a roller 3 formed of a rotating cylinder 2 is short.

Figure 3:
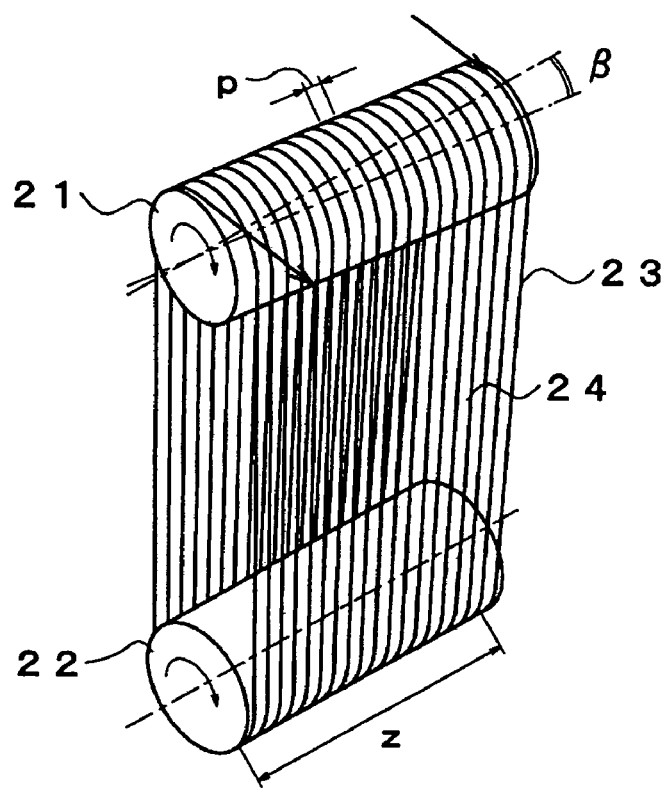
FIG. 3 is a schematic diagram illustrating a principle of Nelson method.

FIG. 3 illustrated a principal view of Nelson Method. A roller 21 and 22 which are the most simple form are misaligned an axis core direction of roller only an angle β from parallel, that a cord 23 left from a roller 21 tries to enter at right angle to a roller 22 and a cord 23 left from a roller 22 tries to enter at right angle to a roller 21. As the result, cycling pitch p of a cord 23 is proportional to an angle β and a distance between rollers 21 and 22. In the invention, forming a cylindrical sheet 24 spirally wrapping continuously a cord contacting with each other according to increase a number of a cord to be supplied, a rubber sheet reinforced with a cord is manufactured by sending the cylindrical rubber sheet on both rotating bodies to an axial direction of a cylinder. Also, in the invention, it is one of the characteristics to be able to shorten also surface length z of a roller transporting a cylindrical rubber sheet 24.

Figure 4:
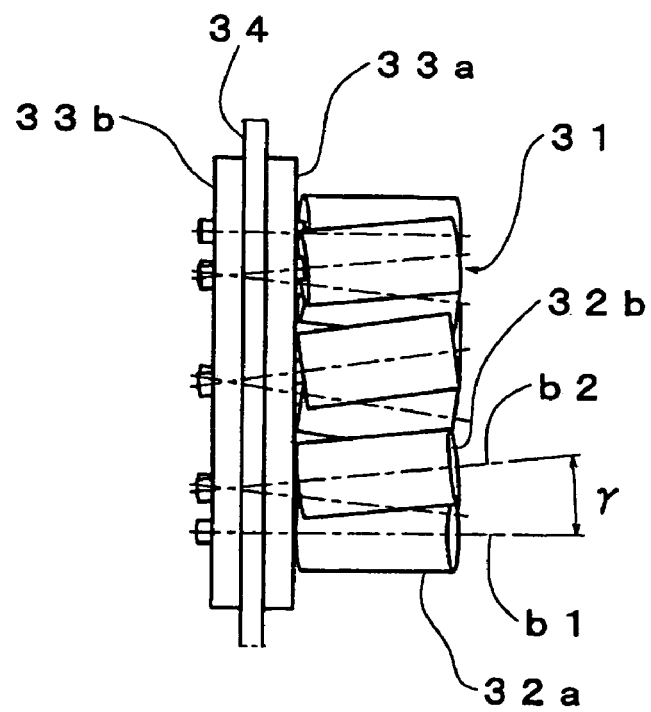
FIG. 4 is a side view of an apparatus for forming a rubber sheet reinforced with a cord according to Kuljian Method of the invention.

FIG. 4 illustrates an outline of a forming apparatus for a rubber sheet reinforced with a cord in Kuljian Method in a side view of an apparatus. A cylindrical rotating body 31 is supported by flanges 33a and 33b disposing many small diameter rollers 32a, 32b . . . on circumference. Small diameter rollers 32a, 32b . . . is desirably driven but may be formed to be able to rotate freely. A frame 34 is sandwiched between flanges 33a and 33b that it is possible to dispose an axial direction among neighboring small diameter rollers 32 tilting only predefined angle γ from parallel with each other by rotating either flange 33a and 33b centering around a central axis of a flange. According to that, neighboring rollers of small diameter roller group of a drawing, for example small diameter rollers 32a and 32b, are disposed obliquely each roller axes b1 and b2 only an angle γ. By that, a cord circulates on a cylindrical rotating body 31 in Kuljian Method. In FIG. 3, although illustrated by a single cord to be understood easily, in the invention, it is possible to manufacture continuously a rubber sheet reinforced with a cord forming a cylindrical rubber sheet spirally wrapping continuously contacting a cord with each other by increasing a number of supplying cords, and by sending that cylindrical rubber sheet continuously to the axial direction of the cylinder of this cylindrical rotating body. A diameter of a cylindrical rubber sheet manufactured by Kuljian Method can be varied according to vary the diameter of the rotating body 31 but the diameter variation of this cylindrical rotating body 31 is conducted by means to be able to change a position freely etc. by providing a position which a small diameter roller 32 is fixed to flange 33 and frame 34 in a multi stage and making a fixed hole a elongate hole.

Figure 5:
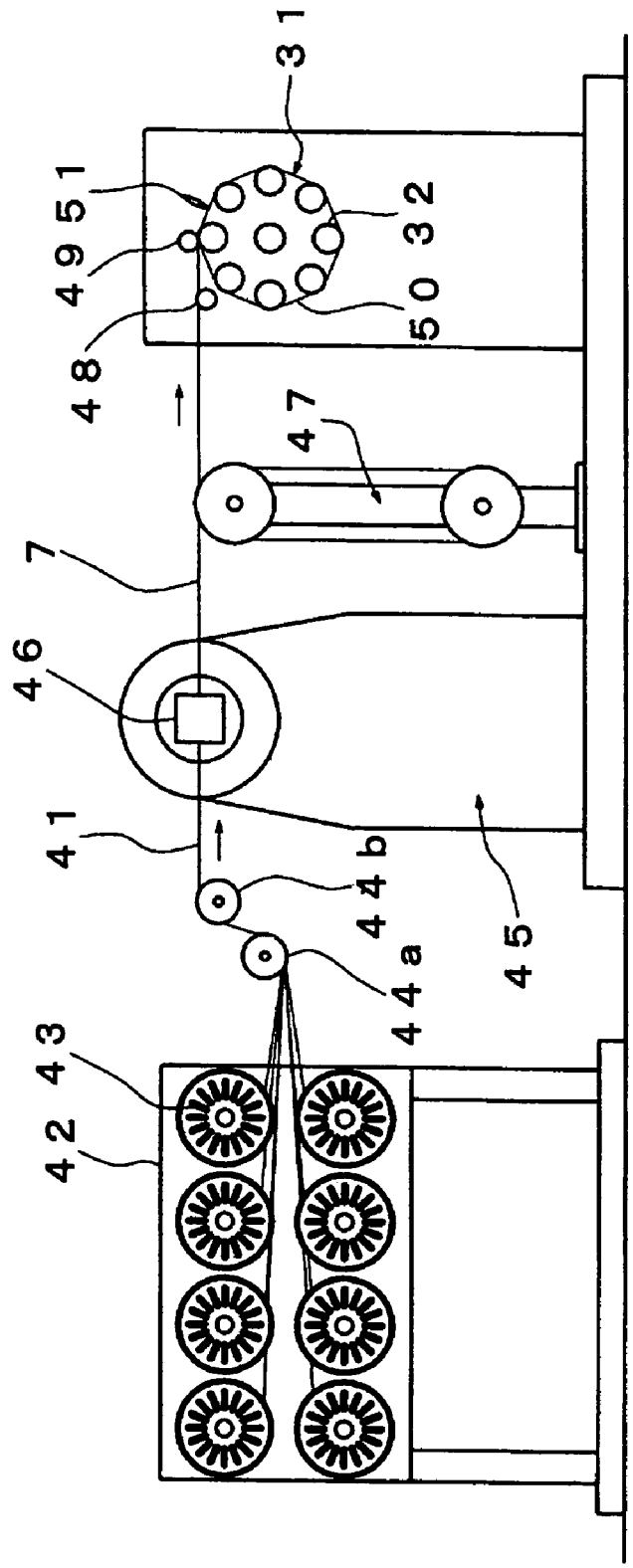
FIG. 5 is a side view of an example of unreeling of a cord, rubber coating to cord and a rubber sheet forming portion are connected in manufacturing process for a rubber sheet reinforced with a cord of the invention.

FIG. 5 illustrates in a side view of an apparatus an example which is connected a rubber coating process coating rubber to cord and a forming apparatus for rubber sheet reinforced with a cord. Plural cords 41 are unreeled from reels or bobbins 43 installed on a creel stand 42 and guided to a die 46 of a rubber extruder 45 through a turn roller 44a and 44b. Unvulcanized rubber is extruded by a rubber extruder 45; unvulcanzied rubber is coated on a cord group 41 by a die 46 and is made to a rubber coated cord group 7. Rubber coating of cord is usually conducted often preheating a cord and preferably a turn roller 44a and 44b is preheated by heating. A rubber coated cord group 7 is guided via a tension adjustment device 47 to a forming apparatus for a rubber sheet consists of a cylindrical rotating body 31 of Kuljian Method and a supply guide 48. The tension adjustment devise 47 also functions as an accumulator. A cylindrical rotating body 31 is formed from a small diameter roller 32 illustrated in FIG. 4, forming a cylindrical rubber sheet 50 consisting of a rubber coated cord pressed by presser tool 49, and becomes a continuous body of a rubber sheet reinforced with a cord of constant product width cutting through by a cutter 51.

Figure 6:
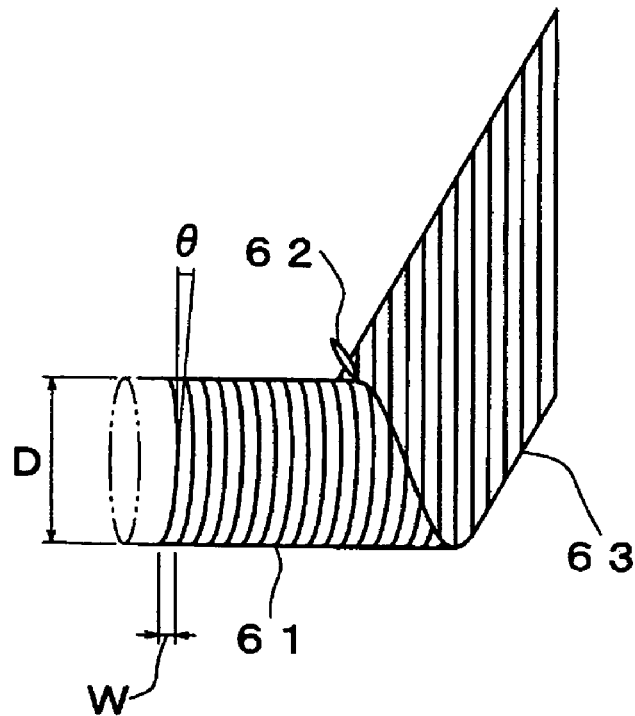
FIG. 6 is an arrangement status of a cord according to cut through method when manufacturing a rubber sheet reinforced with a cord cutting through a cylindrical sheet consist of a rubber coated cord of the invention.
Figure 6:
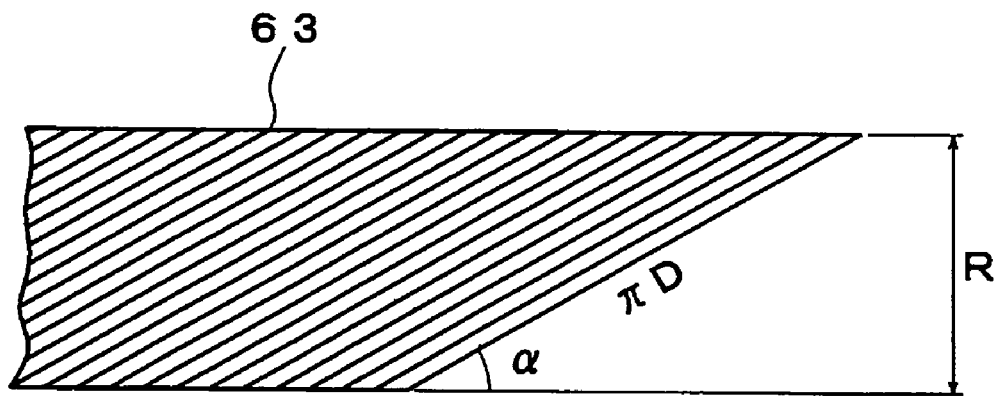

Fig. A in FIG. 6 illustrates a status becoming continuous body of a rubber sheet reinforced with a cord 63 that is an arrangement angle α of a cord by cutting through by a cutter 62 while rotating a cylindrical rubber sheet 61 spirally wound a rubber coated cord group of width w. As a rubber coated cord group (ribbon) to be wrapped around has width w, a cord already has tilt of θ when it is wrapped to a cylindrical rubber sheet, but if w is small, there are many cases that θ can be ignored.

In FIG. B of FIG. 6, a relationship between a cord arrangement angle α in a rubber sheet reinforced with a cord cut through and a diameter D of a cylindrical rubber sheet of width R of a finished product of is illustrated.

Figure 7:
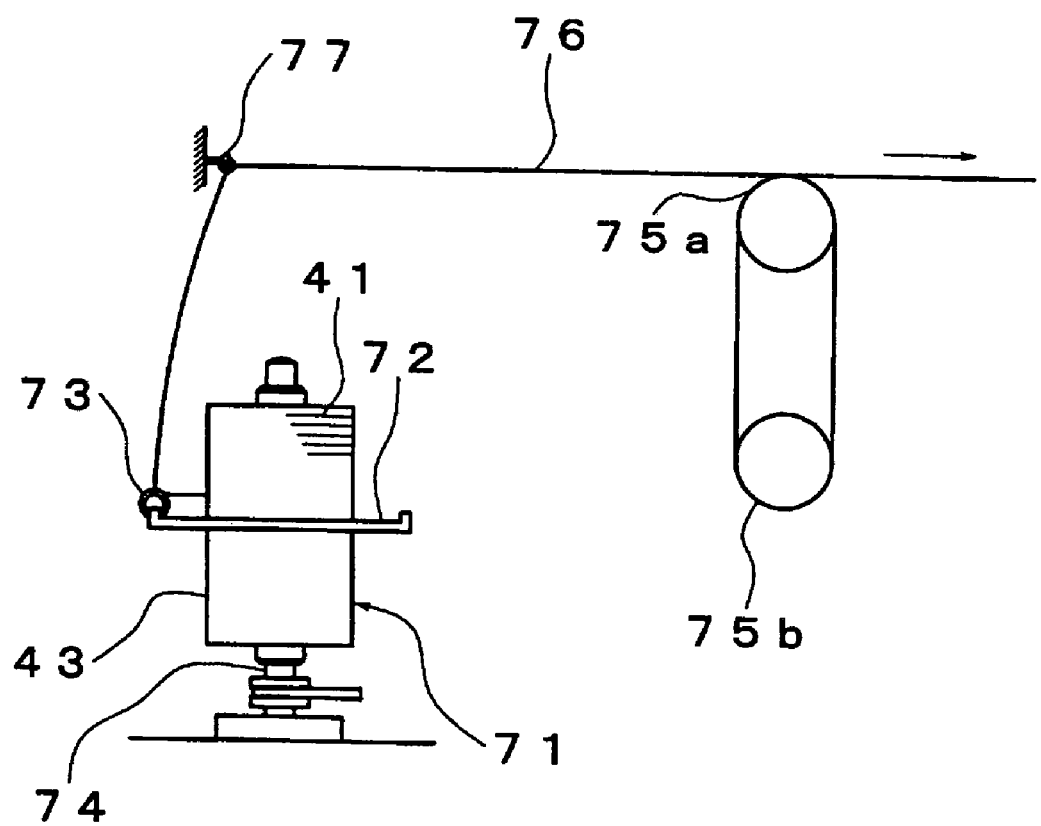
FIG. 7 is a side view of an example of an unreeling machine using a twister of the invention.

FIG. 7 illustrates an example using a twister to an unreeling machine 71 of a cord 41. A cord 41 wound on a bobbin 43 of an unreeling machine 71 is guided via yarn guide 77 passing through a traveler 73 of a ring 72. A bobbin 43 is rotated by drive shaft 74, according to that a cord 41 is twisted by rotation of a traveler 73. That is, an unreeling machine 71 is a ring twister mechanically but using it as an unreeling machine by reversing a flow of a cord, a cord 41 being twisted is pulled out by rotation of driven turn roller 75a and 75b and becomes a twisted cord 76. A twisted cord 76 is guided to a rubber coating process or directly to a cylindrical rotating body. This twister is used as un-twister rotating reversely in a case of a steel cord and can also be used for elimination of a twist entering naturally in an ordinary cord unreeling machine.

Example 1

According to continuously wrapping around a rubber coated cord group using a cylindrical rotating body of the invention illustrated in FIG. 1, an illustrative embodiment manufactured continuously a sheet arranged a rubber coated cord in a constant angle is shown. Unreeled a brass plated steel cord of 1×3×0.27 diameter from 8 pieces of reels, aligning via a comb guide, rubber coating is conducted to pass through in unvulcanized rubber blended natural rubber and SBR extruded from a small rubber extruder of 60 mm diameter. Rubber coated cord is guided to a supply guide passing through a dancer roller working as a tension adjustment device. A rubber coated cord group supplied to a supply guide is spirally wrapped around on a surface of a cylindrical rotating body at velocity of 35 m/min as a cord group of 10 mm width in accordance with rotation of a cylindrical rotating body. A cylindrical rotating body is attached small diameter rollers of 55 mm in a diameter of 8 pieces to a disc shaped flange of 235 mm in a diameter, it is formed to be a disc shaped rotating body of 210 mm in a diameter as a whole and each small diameter roller is driven. Surface length of a roller transporting a cylindrical rubber sheet is 40 mm and a tilt angle γ from parallel with nearby roller of this small diameter group is 3.3 degree. In a position of a center distance of 300 mm with the small diameter roller group, a pairing roller of 80 mm in a diameter is attached with an angle of 3.3 degree in Nelson roller arrangement. Also, according to a push over roller guide and a zipper roller guide illustrated in FIG. 1, it is adjusted not to make a gap among rubber coated cord groups. A rubber coated cord group is wrapped spirally on a surface of this pair of cylindrical rotating bodies, being a cylinder consist of a rubber coated cord and is sent on a surface of a cylindrical rotating body in accordance with a tilt angle of a small diameter roller. A cylinder of the sent rubber coated cord is equilibrated a pressure at the end of a cylindrical rotating body by a presser roller, after ensuring a joint between cords, a sheet that made width to 192 mm and a cord angle α to 27 degree against a longitudinal direction of sheet could be continuously obtained according to cutting away by a cutter to press cut with up and down blades. This rubber sheet arranged a cord obliquely is used in a tire molding machine as belt-ply material which is a member for an automobile tire. Still, this apparatus was possible to obtain a rubber sheet reinforced with a cord which becomes body-ply material or a belt for a tire of a rim diameter from 14 inch type up to 18 inch type according to varying a distance between rollers of a small diameter roller group from 200 mm to 450 mm.

As described above, although embodiments of the invention have been described in detail by drawings and examples, these embodiments are possible to execute changing arbitrarily to various embodiments in scope of the invention in claims and not to limit to above-mentioned examples.

INDUSTRIAL APPLICABILITY

A rubber sheet reinforced with a cord of the invention is used for a sheet for body-ply of a tire, a sheet for a belt, etc. but also used in a field of a rubber sheet that is required strength in other industrial machine etc. such as an air spring, a diaphragm, a belt-conveyer and a flexible container.

The invention claimed is:

1. A manufacturing apparatus for a rubber sheet reinforced with a cord comprising:
   a pair of cylindrical rotating bodies rotating in the same direction, wherein the axes of rotation of the cylindrical rotating bodies are disposed at an oblique, predefined angle to each other,
   a supply guide supplying a rubber coated cord group to the cylindrical rotating bodies,
   the apparatus configured (1) to form a cylindrical rubber sheet by spirally wrapping the rubber coated cord on the pair of cylindrical rotating bodies so that the rubber coated cord is continuously brought into contact with the rubber coated cord already spirally wrapped on the pair of cylindrical rotating bodies and (2) to move the cylindrical rubber sheet on the pair of cylindrical rotating bodies along the axial direction of the cylinder, characterized in that;
      at least one of the pair of cylindrical rotating bodies is formed of a plurality of small rollers forming a roller group; and
      the axis direction of each of the small rollers of the cylindrical rotating body is disposed obliquely at a predefined angle from parallel with the axis direction of the adjacent small rollers.

2. A manufacturing apparatus for a rubber sheet reinforced with a cord according to claim 1, wherein the diameter of said cylindrical rubber sheet may be varied by varying a center distance between said pair of cylindrical rotating bodies.

3. A manufacturing apparatus for a rubber sheet reinforced with a cord according to claim 1, wherein a return position of the rubber coated cord group may be finely adjusted using a push over roller guide after the rubber coated cord group wrapped around said pair of cylindrical rotating bodies has made a circuit around the pair of cylindrical rotating bodies.

4. A manufacturing apparatus for a rubber sheet reinforced with a cord according to claim 1, wherein said cylindrical rotating body which is formed of a plurality of small rollers forming a roller group is of variable diameter by varying a center distance of said small roller group.

5. A manufacturing apparatus for a rubber sheet reinforced with a cord according to claim 1, wherein the apparatus comprises: a pair of zipper roller guides on each of a cord group A and a cord group B, wherein cord group B has already made a circuit of the cylindrical rotating bodies and is wrapped around the cylindrical rotating bodies; the zipper guides acting to push cord group A into contact with cord group B thereby forming a cylindrical rubber sheet from the continuously spirally wrapped rubber coated cord group by supplying a rubber coated cord group to said cylindrical rotating bodies through said supply guide.

6. A manufacturing apparatus for a rubber sheet reinforced with a cord according to claim 1, wherein a surface length of a small roller of said cylindrical rotating body is selected to be 1.5 times or more and 10 times or less of the width of the rubber coated cord group to be processed.

7. A manufacturing apparatus for a rubber sheet reinforced with a cord according to claim 1, wherein each small roller of said roller group of said cylindrical rotating body rotates at constant surface velocity when driven.

8. A manufacturing apparatus for a rubber sheet reinforced with a cord according to clam 1, wherein the apparatus further has a presser tool to press said cylindrical rubber sheet.

9. A manufacturing apparatus for a rubber sheet reinforced with a cord according to clam 1, further including a cutter wherein said cylindrical rubber sheet made by wrapping the rubber coated cord group around on said cylindrical rotating body is cut away spirally thereby providing a rubber sheet in which the cord is arranged at a predefined angle a a to a longitudinal direction of a sheet.

10. A manufacturing apparatus for a rubber sheet reinforced with a cord according to clam 1, wherein a rubber extruder having a rubber coating die is provided upstream of said supply guide, the rubber coated cord group being guided to said cylindrical rotating bodies through the supply guide after the cord has continuously passed through the rubber coating die and has become coated with rubber extruded from the rubber extruder.

11. A manufacturing apparatus for a rubber sheet reinforced with a cord according to clam 1, comprising a cord supplying section having a twister or an assembly winder wherein the cord supplying section is formed to unreel, thereby giving a twist to the cord; and the cord supplying section is formed to guide the twisted cord to said cylindrical rotating bodies through said supply guide.

12. A manufacturing method for a rubber sheet reinforced with a cord, comprising the steps of:
   supplying a rubber coated cord group through a supply guide to a pair of cylindrical rotating bodies, the cylindrical rotating bodies rotating in the same direction and wherein the axes of rotation of the cylindrical rotating bodies are disposed at an oblique, predefined angle to each other;
   forming a cylindrical rubber sheet by continuously spirally wrapping the rubber coated cord group around the cylindrical bodies;
   contacting the rubber coated cord continuously with more of the rubber coated cord already spirally wrapped on the pair of cylindrical rotating bodies;
   and moving the cylindrical rubber sheet on the pair of cylindrical rotating bodies along an axial direction, characterized in that;
      at least one of the pair of cylindrical rotating bodies is formed of a plurality of small rollers forming a roller group; and
      the axis direction of each of the small rollers of the cylindrical rotating body is disposed obliquely at a predefined angle from parallel with the axis direction of the adjacent small rollers.

13. A manufacturing method for a rubber sheet reinforced with a cord according to claim 12, comprising to the step of varying a diameter of said cylindrical rubber sheet by varying a center distance of said pair of cylindrical rotating bodies.

14. A manufacturing method for a rubber sheet reinforced with a cord according to claim 12, comprising the step of finely adjusting a returning position of the rubber coated cord group by using a push over roller guide to position a rubber coated cord group which has made a circuit between said pair of cylindrical rotating bodies.

15. A manufacturing method for a rubber sheet reinforced with a cord according to claim 14, comprising the step of varying a diameter of a cylindrical rotating body which includes a plurality of small rollers forming a roller group by varying a center distance of said roller group and thereby varying the cylinder diameter of said cylindrical rubber sheet.

16. A manufacturing method for a rubber sheet reinforced with a cord according to claim 12, comprising the step of conducting a push over to contact cord groups A and B with each other by providing a pair of zipper roller guides on each of cord group A and B when forming the cylindrical rubber sheet; continuously spirally wrapping the rubber coated cord group A; supplying a rubber coated cord group A to said cylindrical rotating bodies through said supply guide and supplying rubber coated cord group A to rubber coated cord group B which has already made a circuit and wrapped around on the cylindrical rotating bodies.

17. A manufacturing method for a rubber sheet reinforced with a cord according to claim 12, comprising the step of disposing the cord at a predefined angle a to a longitudinal direction of a sheet by using a cutter to cut said cylindrical rubber sheet spirally once the cylindrical rubber sheet has been formed by wrapping around said cylindrical rotating bodies.

18. A manufacturing method for a rubber sheet reinforced with a cord according to claim 12, comprising the step of guiding the rubber coated cord group to said cylindrical rotating bodies through said supply guide while being formed continuously by passing a cord supplied to said cylindrical rotating bodies through a rubber coating die and coating the cord with rubber extruded from a rubber extruder.

* * * * *